(12) United States Patent
McIsaac et al.

(10) Patent No.: US 7,376,629 B1
(45) Date of Patent: May 20, 2008

(54) METHOD OF AND SYSTEM FOR EFFECTING ANONYMOUS CREDIT CARD PURCHASES OVER THE INTERNET

(75) Inventors: Joseph E. McIsaac, Burlington, MA (US); Leonid Braginsky, Newton, MA (US); Mark Zand, Brighton, MA (US); David W. Jellison, Amesbury, MA (US)

(73) Assignee: Incogno Corporation, Boston, MA (US)

( * ) Notice: Subject to any disclaimer, the term of this patent is extended or adjusted under 35 U.S.C. 154(b) by 237 days.

(21) Appl. No.: 09/826,052

(22) Filed: Apr. 3, 2001

Related U.S. Application Data

(60) Provisional application No. 60/273,595, filed on Mar. 5, 2001, provisional application No. 60/254,056, filed on Dec. 7, 2000, provisional application No. 60/251,984, filed on Dec. 7, 2000, provisional application No. 60/194,346, filed on Apr. 3, 2000.

(51) Int. Cl.
*G06Q 99/00* (2006.01)
(52) U.S. Cl. .................. 705/78; 705/79; 705/50; 705/51; 705/64; 705/67
(58) Field of Classification Search .............. 705/78, 705/79, 50, 51, 64, 67
See application file for complete search history.

(56) References Cited

U.S. PATENT DOCUMENTS

| | | | | |
|---|---|---|---|---|
| 4,977,595 | A * | 12/1990 | Ohta et al. ............... | 705/69 |
| 5,420,926 | A * | 5/1995 | Low et al. ............... | 705/74 |
| 5,754,656 | A * | 5/1998 | Nishioka et al. ......... | 705/74 |
| 5,768,385 | A * | 6/1998 | Simon ..................... | 705/69 |
| 5,815,657 | A | 9/1998 | Williams et al. ......... | 395/186 |

(Continued)

FOREIGN PATENT DOCUMENTS

JP 2006185179 * 7/2006

OTHER PUBLICATIONS

U.S. Appl. No. 60/181,224, filed Feb. 9, 2000, Tsiounis et al.

(Continued)

*Primary Examiner*—Pierre Eddy Elisca
(74) *Attorney, Agent, or Firm*—Mark G. Lappin; Foley & Lardner LLP

(57) ABSTRACT

A transaction system for performing secure transactions over a communication network includes (i) a merchant server system including a computer processor and associated memory, the merchant server system offering items for sale; (ii) a buyer system including a computer processor and associated memory, the buyer system being selectively couplable to the merchant server system over the communication network to initiate a transaction, wherein, during the transaction, the buyer system selects one or more of the items for purchase; (iii) a security server system including a computer processor and associated memory and an encryption device, the security server system receiving buyer information from the buyer system, encrypting the buyer information in an encryption key that prevents the merchant server system from decrypting the buyer information, and transferring the encrypted buyer information to the merchant server system; and (iv) a third server system including a computer processor and associated memory, the third server system being selectively couplable to the merchant server system, wherein the merchant server system transmits at least a portion of the encrypted buyer information to the third server system for processing during the transaction.

14 Claims, 13 Drawing Sheets

U.S. PATENT DOCUMENTS

| | | | | |
|---|---|---|---|---|
| 5,825,881 | A | * | 10/1998 | Colvin, Sr. .................. 705/78 |
| 5,850,442 | A | | 12/1998 | Muftic ........................ 380/21 |
| 5,903,652 | A | * | 5/1999 | Mital .......................... 705/78 |
| 5,909,492 | A | * | 6/1999 | Payne et al. ................. 705/78 |
| 5,926,548 | A | * | 7/1999 | Okamoto ..................... 705/69 |
| 6,076,078 | A | * | 6/2000 | Camp et al. ................. 705/65 |
| 6,336,095 | B1 | * | 1/2002 | Rosen .......................... 705/1 |
| 6,970,562 | B2 | * | 11/2005 | Sandhu et al. ................ 380/30 |
| 6,971,030 | B2 | * | 11/2005 | Dutta .......................... 380/30 |
| 2001/0039535 | A1 | | 11/2001 | Tsiounis et al. |
| 2004/0260653 | A1 | * | 12/2004 | Tsuei et al. ................... 705/54 |

OTHER PUBLICATIONS

U.S. Appl. No. 60/181,225, filed Feb. 9, 2000, Tsiounis et al.

* cited by examiner

METHOD OF AND SYSTEM FOR EFFECTING ANONYMOUS CREDIT CARD PURCHASES OVER THE INTERNET

CROSS-REFERENCED APPLICATIONS

This application claims the benefit from U.S. application Ser. No. 60/194,346, filed Apr. 3, 2000; U.S. application Ser. No. 60/254,056, filed Dec. 7, 2000; U.S. application Ser. No. 60/251,984, filed Dec. 7, 2000; and U.S. application Ser. No. 60/273,595, filed Mar. 5, 2001, the disclosures of which are hereby incorporated by reference into this application.

FIELD OF THE INVENTION

This invention relates generally to a method of and system for effecting anonymous and secure credit card purchases over the internet and more particularly to a method of and system for encrypting and distributing a purchaser's private information such that only parties authorized to receive the information receive it and are able to decrypt it.

BACKGROUND OF THE INVENTION

To make purchases using the Internet, buyers are required to disclose the buyer's name, address, shipping address, and credit card number to the merchant. Many would-be purchasers are uncomfortable with providing such information to the Web merchant, because they are concerned that their credit card numbers could be misused and that their privacy could be compromised. As a result, such potential buyers choose not to use the Internet to make purchases or restrict their purchases to particular merchants whom they trust. The growth of e-commerce is restricted by these privacy and security concerns.

Likewise, businesses that make Internet purchases from other businesses using the Internet are required by present Internet order processing systems to reveal identifying and payment information to the selling business that may result in the compromise of information regarding the transaction that the buyer would prefer to remain private.

SUMMARY OF THE INVENTION

The growth of the Internet for consumer and commercial transactions creates a need to control what information is revealed to whom in the course of the transaction. In the case of Internet transactions that involve more than two parties (such as an e-commerce transaction involving a buyer, a seller, a merchant acquirer, and a delivery company), all participants will benefit from a technology solution that provides each party with only that kind and amount of information about the transaction that is required in order for the transaction to be completed.

The preferred solution to the Internet privacy problem will not require the buyer to take extra steps such as downloading software or browsing to a special Internet site in order to obtain an alias identity. Most buyers will be unwilling to take such extra effort, and will prefer a solution that will enable them to browse directly to the merchant's Web site and to make private and secure purchases without the need to take any extra steps or precautions, and without noticeable latency.

The preferred solution to the need to control the distribution of information among multiple parties to an Internet transaction will manage disclosure to each party such that each party receives only that information it needs to complete the transaction, without any need to establish any party as a trusted repository of the information of others.

The present invention provides a method and system for anonymous and secure Internet commerce under which each party to a transaction receives only the specific information it needs to know in order for the transaction to be completed, and by which the buyer can remain anonymous to the merchant. The invention enables the buyer to browse directly to the merchant's Web site without taking any extra or preliminary steps, and also enables the transaction to be consummated without disclosure of the buyer's name, address or credit card number to the merchant. The invention further enables the merchant to determine what specific information of the buyer will be disclosed to the merchant, and thus to offer the buyer a technological guarantee that it will not see any buyer information that is designated by the merchant as private to the buyer. Where the merchant is offering anonymity to the buyer, the invention provides a method and system by which the buyer's anonymity is protected, not only for purchases, but also for ordinary returns and chargebacks. In addition, the invention enables the buyer and seller to communicate privately by e-mail.

The buyer begins the transaction by browsing to the Web site of the Internet merchant, where the buyer identifies any items it wishes to purchase and places them in a shopping cart. The buyer is not required to browse first to a third-party's Web site, nor is the buyer required to download any software.

After selecting the items it wishes to purchase from the merchant's Web site, the buyer clicks on a checkout button and is redirected to the security server system of the present invention, which resides on a different computer than that of the merchant. The security server system serves up one or more forms that are filled in by the buyer, consisting of one or more checkout forms, a payment instrument form, an email address form, and a delivery information form. Some or all of these data supplied by the buyer are encrypted using the public keys of those entities that need to know those items of information in order for the transaction to be completed and assembled into a protected information package that is then sent from the security server system to the merchant. Preferably, a public key security system such as RSA is used to encrypt the buyer's information.

The merchant receives the information package(s) and stores their data elements in an order management database in their encrypted form. The merchant does not possess the capability of decrypting information in the protected information package that is delivered to the merchant in encrypted form, although it does have the capability of reading any information that is passed to the merchant from the security server system in unencrypted form.

The merchant sends an encrypted payment authorization request to the merchant acquirer or to the issuing bank. The merchant acquirer or issuing bank decrypts the payment authorization request, processes that request, and sends a response to the merchant either authorizing or denying the transaction. The merchant can communicate with the buyer without knowing the real e-mail address of the buyer by using a secure mail feature of the present invention. In that situation, the merchant directs its e-mail to the buyer through the security server system. The security server system assigns alias identities to the merchant and the buyer. Only the merchant can communicate with the buyer using the secure mail feature.

In situations where the buyer is purchasing hard goods for delivery to his address, the merchant sends an encrypted delivery request to the delivery company containing the buyer's name and shipping address and an order number, or other appropriate information. The delivery company decrypts the delivery request and provides the merchant with a numerical identifier that it associates with the goods ordered by the buyer. The merchant, or a party providing fulfillment services on behalf of the merchant, receives the numerical identifier and places it on the package containing the goods ordered by the buyer. The delivery company picks up the package from the merchant or fulfillment party, translates the numerical identifier as necessary, and delivers the package to the buyer.

The invention also accommodates returns and chargebacks without comprising the anonymity of the buyer.

The invention satisfies the following objectives:

1. Buyers can make online purchases without disclosing their names, addresses, or payment instrument information to the seller.
2. Buyers are not required to go to third-party Web sites or to download software in order to make anonymous and secure purchases from the merchant. All the buyer has to do is to browse directly to the merchant's site and make a purchase by filling in a shopping cart and providing the standard items of information by completing standard forms served to the buyer.
3. Internet merchants can offer complete anonymity to privacy-sensitive buyers and eliminate the risk of loss from credit card theft and hacking.
4. Merchants using the invention can continue to offer personalization to their customers.
5. Merchants using the invention select the level of privacy that will be delivered to their customers—full anonymity or credit card privacy. In both cases, the merchant never receives, stores or transmits the customer's credit card information.
6. The invention provides a universal transaction interface through which merchants can deploy a wide range of new payment and security technologies (including smart cards, biometric identity verification, digital signatures, on-line checks, ATM cards, and person-to-person payments) without further changes to the merchant's order processing systems.
7. The invention permits e-mail communications without compromising the anonymity of the buyer.

According to one aspect of the invention, a transaction system for performing secure transactions over a communication network includes (i) a merchant server system including a computer processor and associated memory, the merchant server system offering items for sale; (ii) a buyer system including a computer processor and associated memory, the buyer system being selectively couplable to the merchant server system over the communication network to initiate a transaction, wherein, during the transaction, the buyer system selects one or more of the items for purchase; (iii) a security server system including a computer processor and associated memory and an encryption device, the security server system receiving buyer information from the buyer system, encrypting the buyer information in an encryption key that prevents the merchant server system from decrypting the buyer information, and transferring the encrypted buyer information to the merchant server system; and (iv) a third server system including a computer processor and associated memory, the third server system being selectively couplable to the merchant server system, wherein the merchant server system transmits at least a portion of the encrypted buyer information to the third server system for processing during the transaction.

The third server system may be one of a delivery server system and a payment processor server system. The encrypted buyer information received by the delivery server system may be delivery address information of the buyer. The encrypted buyer information received by the payment processor server system may be payment information of the buyer. The transaction system may further include a fourth server system including a computer processor and associated memory, the fourth server system being selectively couplable to one of the merchant server system and the third server system, wherein the one of the merchant server system and the third server system transmits at least a portion of the encrypted buyer information to the fourth server system for processing during the transaction. The security server system may encrypt the buyer information into a first document and a second document, wherein the first document is transmitted to the third server system by the merchant server system and the second document is transmitted to the fourth server system by the merchant server system. The security server system may encrypt the buyer information into a first document and a second document, wherein the first and second documents are transmitted to the third server system by the merchant server system and the second document is transmitted to the fourth server system by the third server system. The third server system may be one of a delivery server system and a payment processor server system and wherein the fourth server system is the other of the delivery server system and the payment processor server system, and wherein the first document may contain one of the buyer system's delivery address information and the buyer system's payment information and the second document may contain the other of the buyer system's delivery address information and the buyer system's payment information. The security server system may encrypt the first document using a first encryption key and the second document using a second encryption key, wherein the one of the third server system and the fourth server system that receives the first document can decrypt the first document but not the second document and wherein the other one of the third server system and the fourth server system that receives the second document can decrypt the second document but not the first document According to another aspect of the invention, a system for performing secure transactions over a communication network includes (i) a merchant server system including a computer processor and associated memory, the merchant server system offering items for sale; (ii) a buyer system including a computer processor and associated memory, the buyer system being selectively couplable to the merchant server system over the communication network to initiate a transaction, wherein, during the transaction, the buyer system selects one or more of the items for purchase; (iii) a security server system including a computer processor and associated memory, the security server system being selectively couplable to the buyer system to receive buyer information from the buyer system in the course of the transaction, the buyer information including delivery address information and payment information; (iv) a delivery server system including a computer processor and associated memory; and (v) a payment processor server system including a computer processor and associated memory. The security server transmits the delivery address information to the delivery server system and the payment information to the payment processor server system.

The security server system may encrypt the delivery address information into a first document and the payment information into a second document. The security server system may transmit the first and second document to the merchant server system, which transmits the first document to the delivery server system and the second document to the payment processor server system. The merchant server system is incapable of decrypting the first and second documents.

According to another aspect of the invention, a transaction system for performing secure transactions over a communication network includes (i) a merchant server system including a computer processor and associated memory, the merchant server system offering items for sale; (ii) a buyer system including a computer processor and associated memory, the buyer system being selectively couplable to the merchant server system over the communication network to initiate a transaction, wherein, during the transaction, the buyer system selects one or more of the items for purchase and transmits information regarding the one or more items to the merchant server system; (iii) a security server system including a computer processor and associated memory and an encryption device, the security server system receiving buyer information from the buyer system, encrypting the buyer information in an encryption key that prevents the merchant server system from decrypting the buyer information, and transferring the encrypted buyer information to the merchant server system; and (iv) a third server system including a computer processor and associated memory, the third server system being selectively couplable to the merchant server system, wherein the merchant server system transmits at least a portion of the encrypted buyer information to the third server system for processing during the transaction.

According to another aspect of the invention, a system for performing secure transactions over a communication network includes (i) a merchant server system including a computer processor and associated memory, the merchant server system offering items for sale; (ii) a buyer system including a computer processor and associated memory, the buyer system being selectively couplable to the merchant server system over the communication network to initiate a transaction, wherein, during the transaction, the buyer system selects one or more of the items for purchase and (iii) a security server system including a computer processor and associated memory and an encryption device, the security server system receiving buyer information from the buyer system and forming a merchant document including information regarding the item being purchased, encrypting the buyer information into a payment document including the buyer's payment information and encrypting the buyer information into an address document including the buyer's shipping address. The security server system transfers the buyer information to a first one of the merchant server system, a payment server system and a delivery server system, wherein the first system removes the document associated with the first system and transmits the remaining documents to a second one of the merchant server system, the payment server system and the delivery server system, wherein the second system removes the document associated with the second system and transmits the remaining document to a third one of the merchant server system, the payment server system and the delivery server system. The security server system encrypts the buyer information using an encryption key in which only the payment server system is capable of decrypting the payment document and only the delivery server system is capable of decrypting the address document.

According to yet another aspect of the invention, a method for performing secure transactions over a communication network includes:

A. establishing a connection between a buyer system and a merchant server system over the communications network to initiate a purchase transaction;

B. the buyer system selecting an item offered for sale by the merchant server system;

C. the buyer system transmitting buyer information to a security server system;

D. the security server system encrypting the buyer information using an encryption key that prevents the merchant server system from decrypting the encrypted buyer information;

E. the security server system transmitting the encrypted buyer information to the merchant server system;

F. the merchant server system transmitting at least a portion of the encrypted buyer information to a third server system for processing during the purchase transaction; and G. the third server system decrypting the at least a portion of the encrypted buyer information before processing the information.

According to yet another aspect of the invention, a method for identifying a party includes, in a security server system including a computer processor and associated memory, the security server system being selectively couplable to a second server system, including a computer processor and associated memory, over a communications network, performing the steps of:

A. obtaining a plurality of identifying indicia from each of a plurality of parties;

B. performing a one-way hash function on each of the plurality of identifying indicia to form a plurality of hashed identifiers, wherein a particular output of the one-way hash function is unique to a particular input of the hash function;

C. forming an array of hashed identifiers for each of the plurality of parties, wherein each array includes a number of hashed identifiers that are unique to each party; and in the second server system, performing the steps of:

D. receiving an identifying indicium from a party;

E. performing the hash function on the indicium to form a hashed indicium;

F. parsing each of the arrays to determine if the hashed indicium coincides with a hashed identifier therein;

G. determining which, if any, of the arrays contains a coincidence between the hashed indicium and a hashed identifier;

wherein, if only one coincidence occurs, the method comprises:

H. identifying a unique party from the plurality of parties based the coincidence between the hashed indicium and the hashed identifier; and wherein, if more than one coincidence occurs, the method comprises:

I. repeating steps D-G until one of the arrays contains a set of coincidences that none of the other arrays contain; and J. identifying a unique party from the plurality of parties based on the set of coincidences.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

Figure 1:
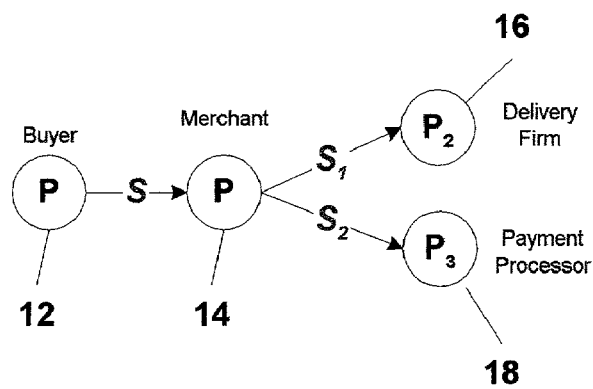
FIG. 1 is a schematic diagram of conventional information distribution in an online transaction.

FIG. 1 is a schematic diagram of a conventional online transaction in which a buyer 12, during the course of the online transaction, provides certain information S to the merchant 14. This information S includes the buyer's delivery address, payment information, such as a credit card number, and information about the item being purchased. In this conventional transaction, the merchant 14 possesses and has access to all of the buyer's information. The merchant 14 distributes the buyer's delivery address information $S_1$ to the delivery firm 16 and distributes the buyer's payment information $S_2$ to the payment processor 18. When the payment is approved by the payment processor 18, the transaction is consummated and the delivery firm 16 picks up the item from the merchant 14 or an agent of the merchant 14 and delivers the item to the buyer 12. While this type of transaction has been generally successful in enabling buyers to purchase item from merchants, a potential security risk exists since at least one party other than the buyer has possession of all of the buyer's private information.

Figure 2:
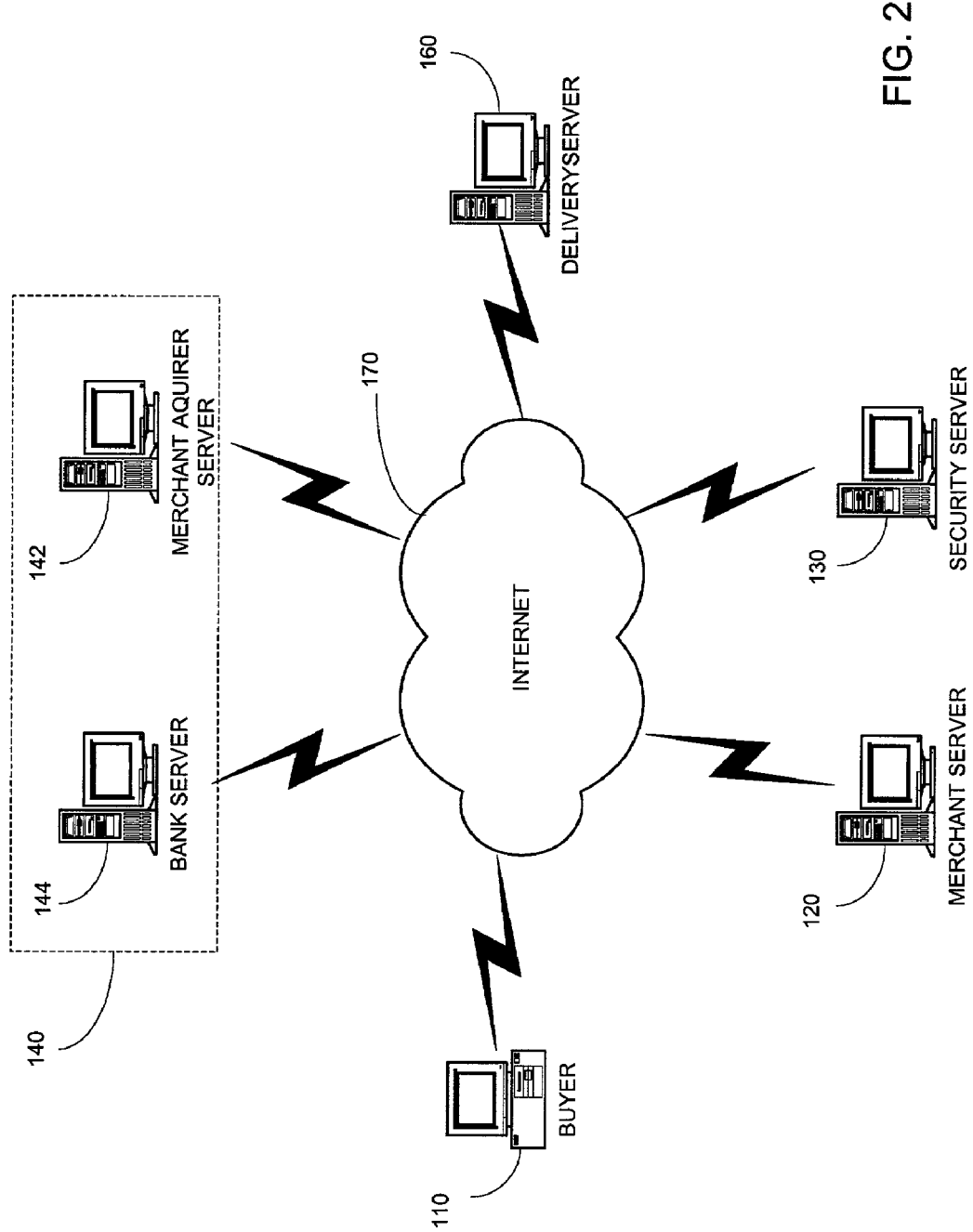
FIG. 2 is a schematic diagram of the system for effecting anonymous credit card purchases in accordance with the present invention.

FIG. 2 shows a diagram of a system 100 for enabling secure online transactions in which the merchant either never possesses all of the buyer's information or possesses the information in a form that it cannot read in accordance with a preferred embodiment of the present invention. The system 100 includes buyer system 110, merchant server system 120, security server system 130, a payment processor server system 140, including merchant acquirer server system 142 and bank server system 144, and delivery server system 160, all connected to a common communications network 170. Preferably, the buyer system 110, merchant server system 120, security server system 130, merchant acquirer server system 142, bank server system 144 and delivery server system 160 are each a personal computer such as an IBM PC or IBM PC compatible system or an APPLE® MacINTOSH® system or a more advanced computer system such as an Alpha-based computer system available from Compaq Computer Corporation or SPARC® Station computer system available from SUN Microsystems Corporation, although a main frame computer system can also be used. Preferably, the communications network 170 is a TCP/IP-based network such as the Internet or an intranet, although almost any well known LAN, WAN or VPN technology can be used.

In one preferred embodiment of the invention, the buyer system 110 is an IBM PC compatible system operating an operating system such as the Microsoft Windows® operating system, and merchant server system 120, security server system 130, merchant acquirer server system 142, bank server system 144 and delivery server system 160 are configured as web servers providing access to information such as web pages in HTML format via a protocol such as the HyperText Transport Protocol (http). The buyer system 110 includes software to allow viewing of web pages, commonly referred to as a web browser, thus being capable of accessing web pages located on merchant server system 120 and security server system 130. Alternatively, buyer system 110 can be any wired or wireless device that can be connected to a communications network, such as an interactive television system, such as WEBTV, a personal digital assistant (PDA) or a cellular telephone. In this preferred embodiment, merchant server system 120 is an e-tail system offering a plurality of items for sale over the Internet.

While the specific steps involved in the secure transaction system of the present invention are described in detail below, FIGS. 3A-3E are schematic diagrams showing various forms of transactions that are achievable with the present invention. Each of FIGS. 3A-3E shows the transfer of information after the buyer has selected an item to purchase from the merchant server system and has proceeded to the checkout process.

Figure 3A:
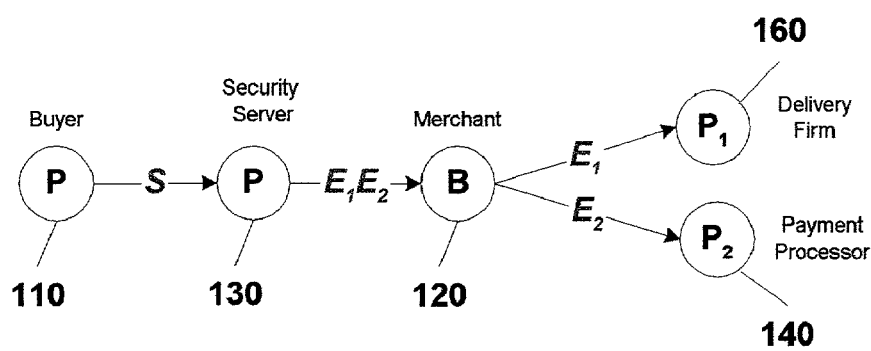
FIGS. 3A-3F are schematic diagrams showing different types of transactions that may be carried out according to the present invention.

FIG. 3A shows a transaction in which the buyer system 110 provides a set of information S to the security server system 130. As set forth above the information S includes the buyer's delivery address information, payment information and optionally, information about the item being purchased, such as a stock number, etc. The security server system, which is operated separately from the merchant, is dedicated to collecting the buyer's information and protecting the buyer's information as encrypted documents. In the transaction of FIG. 3A, two encrypted documents are created from the buyer's information S: a delivery document $E_1$ that can only be decrypted by the participating delivery server system 160 and a payment document $E_2$ that can only be decrypted by the participating payment processor server system 140. Once encrypted, the documents $E_1$ and $E_2$ are then transmitted to the merchant server system 120 for storage and processing. At no time can the merchant server system 120 decrypt the documents, but the merchant server system 120 can use them for a full range of services, including all credit card transaction types (e.g. authorization, settlement, void, chargeback) and for shipping and returns.

Thus, the merchant server system 120 can never see the personal information S of the buyer, but is not hindered in its service offering.

Figure 3B:
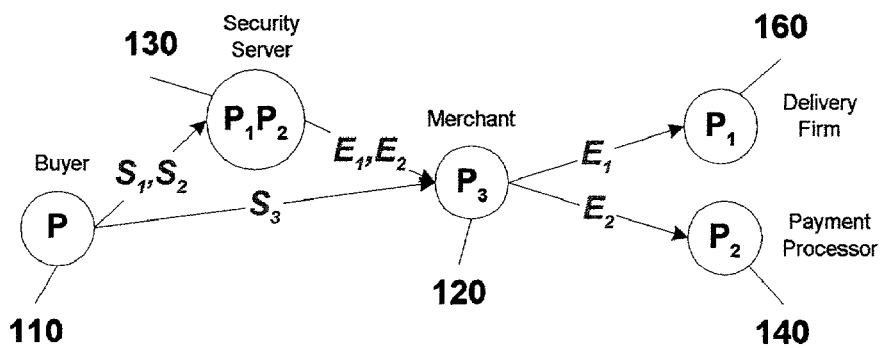

FIG. 3B shows a transaction where the buyer's delivery address information $S_1$ and payment information $S_2$ are transmitted to the security server system 130 while the purchase item information $S_3$ is transmitted directly to the merchant server system 120. The security server system 130 encrypts the information $S_1$ and $S_2$ to form encrypted documents $E_1$ and $E_2$ which are transmitted to the merchant server system 120. The merchant server system 120 then transmits the encrypted delivery document $E_1$, which includes the buyer's delivery address information, to the delivery server system 160 and transmits the encrypted payment document $E_2$, which includes the buyer's payment information, to the payment processor server system 140. The delivery server system 160 and the payment processor server system 140 then decrypt their respective documents and the transaction can then be carried out without the merchant ever having possession of the buyer's deliver address information or payment information.

Figure 3C:
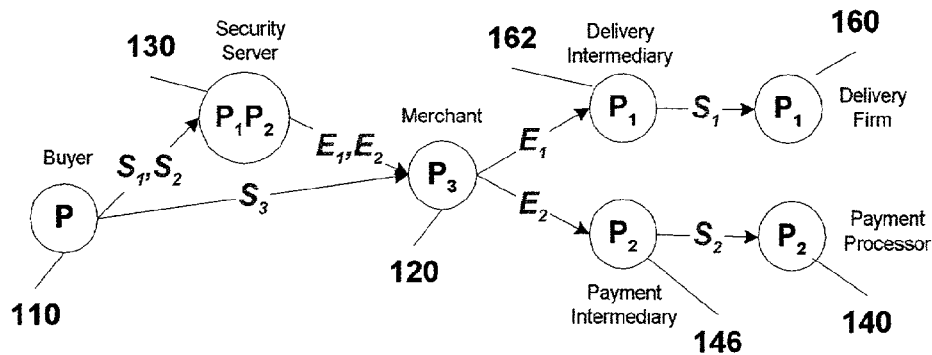

FIG. 3C shows a transaction in which transfer of information between the buyer system 110, the security server system 130 and the merchant server system 120 is the same as that shown in FIG. 3B. However, in this transaction, the encrypted delivery document $E_1$ is transmitted from the merchant server system 120 to a intermediate delivery server system 162 which decrypts the document $E_1$ and transmits the decrypted information $S_1$ to the delivery server system 160. Likewise, the encrypted payment document $E_2$ is transmitted from the merchant server system 120 to an intermediate payment server system 146 which decrypts the document $E_2$ and transmits the decrypted information $S_2$ to the payment processor server system 140.

Figure 3D:
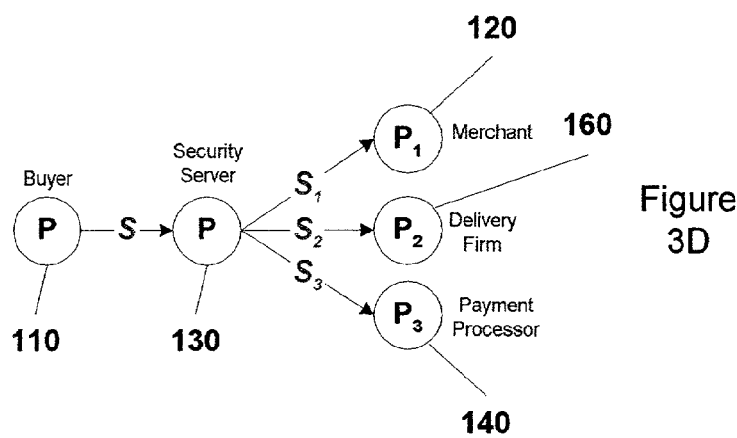

FIG. 3D shows a fork-type transaction in which the buyer 110 provides its information S to the security server system 130. The security server system then separates the information into separate documents and distributes the delivery address information $S_1$ to the delivery server system 160, the payment information $S_2$ to the payment processor server system and the purchase item information $S_3$ to the merchant server system 120. In this transaction, even though the buyer's information is not encrypted, the security server system 130 ensures that each server system receives only the information necessary for it to enable the purchase transaction.

Figure 3E:
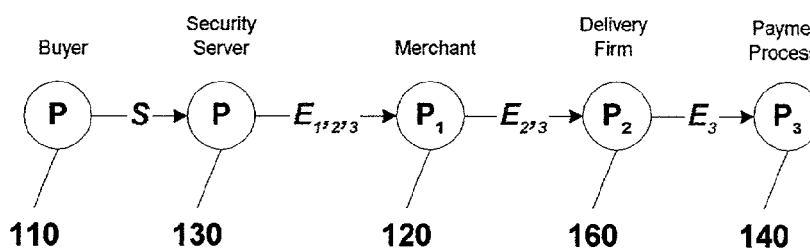

FIG. 3E shows an encryption pipe-type transaction, in which the buyer 110 provides its information S to the security server system 130. The security server system 130 encrypts the information to form an encrypted document $E_1$, which includes the buyer's delivery address information and an encrypted document $E_2$, which includes the buyer's payment information. The encrypted documents $E_1$ and $E_2$ are then transmitted to the merchant server system 120, which transmits both encrypted documents to the delivery server system 160, which retains the encrypted delivery document $E_1$ and transmits the remaining encrypted payment document $E_2$ to the payment processor server system 140.

Figure 3F:
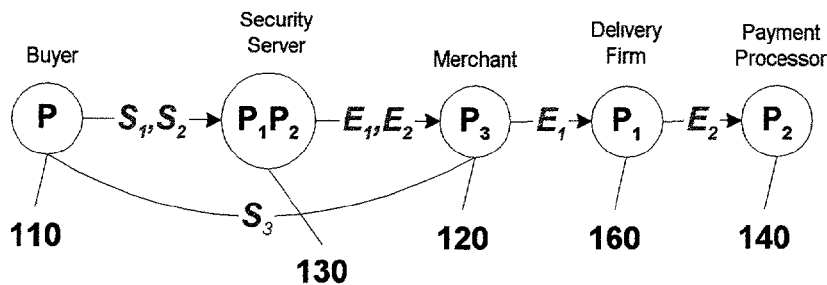

FIG. 3F shows an encryption pipe-type transaction, in which the buyer 110 provides its delivery address information $S_1$ and its payment information $S_2$ to the security server system and order information $S_3$, particularly information regarding the item being purchased by the buyer, to the merchant server system 120. The security server system 130 encrypts the information $S_1$ and $S_2$ to form an encrypted document $E_1$ and $E_2$, respectively. The encrypted documents $E_1$ and $E_2$ are then transmitted to the merchant server system 120, which transmits both encrypted documents to the delivery server system 160, which retains the encrypted delivery document $E_1$ and transmits the remaining encrypted payment document $E_2$ to the payment processor server system 140.

In a preferred embodiment of the invention, the buyer's private information, including delivery address information and payment information, is not disclosed to the merchant server system 120. The buyer provides this information directly to the security server system 130 which encrypts the delivery address information into a delivery document and encrypts the payment information into a payment document. These documents are encrypted using a key which enables only the delivery server system 160 to decrypt the delivery document and which enables only the payment processor server system 140 to decrypt the payment document. These documents are transmitted by the security server system 130 to the merchant server system 120, which then transmits the delivery document to the delivery server system 160 and the payment document to the payment processor server system 140. The payment processor server system 140 is able to decrypt the payment document to authorize the payment and the delivery server system 160 is able to decrypt the delivery document to provide delivery of the purchased item to the buyer. In order to enable the delivery server system 160 to deliver the item from the merchant, the delivery server system provides the merchant server system 120 with an address signature code which preferably is a bar code that corresponds to an order number on the merchant server system. The delivery address information of the buyer is stored in the delivery server system and is "tagged" with the address signature. The merchant server system labels the package containing the item with the address signature. When the delivery firm associated with the delivery server system 160 picks up the package from the merchant, it reads the address signature to determine the address to which the package will be delivered.

Figure 4:
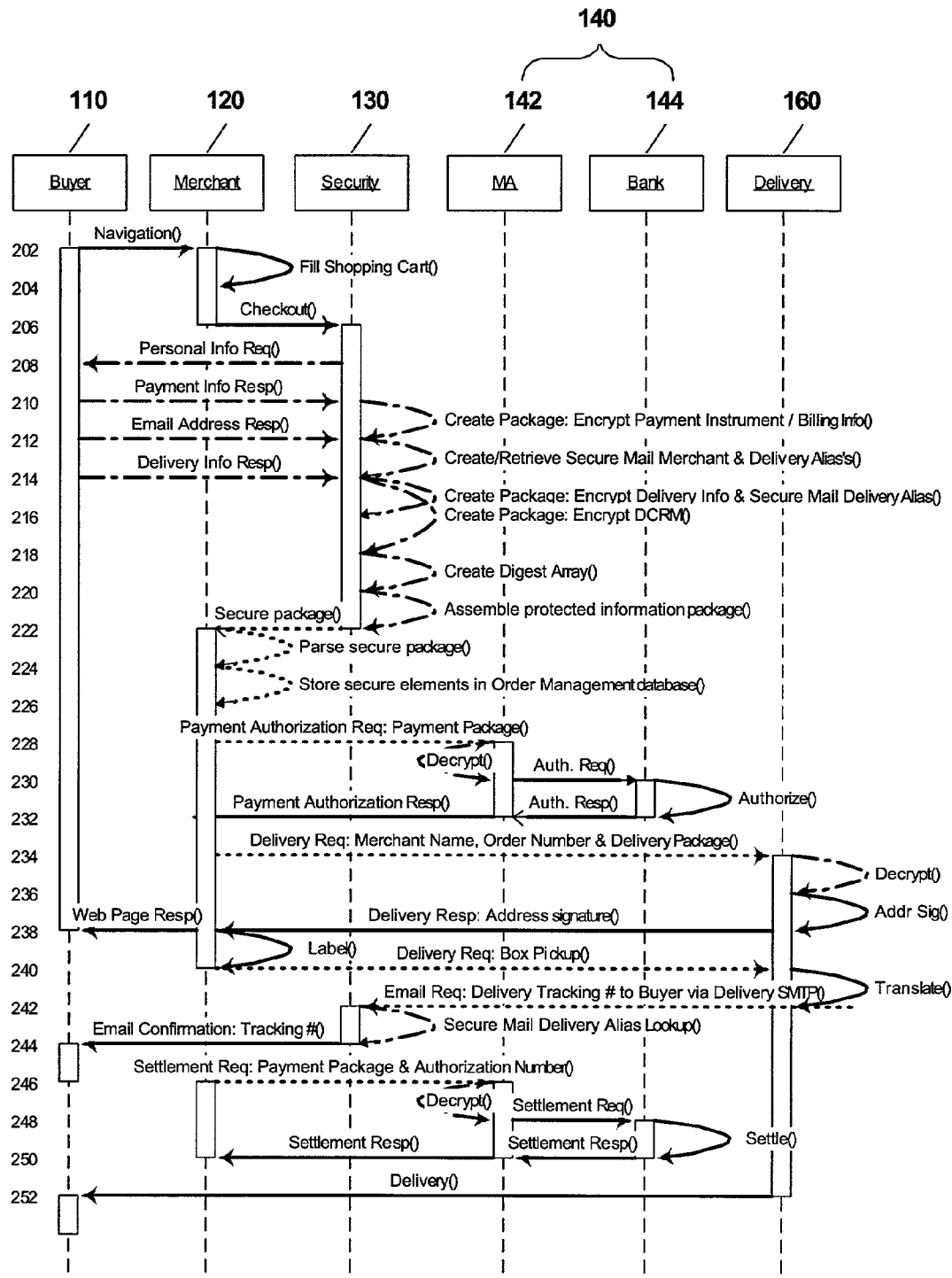
FIG. 4 is a schematic diagram showing the steps involved in a purchase transaction in accordance with the present invention.

FIG. 4 is a schematic diagram which specifically shows this transfer of information between the buyer system 110, merchant server system 120, security server system 130, merchant acquirer server system 142, bank server system 144 and delivery server system 160 in accordance with the present invention. In each of FIGS. 4-10, a vertical bar in the column below each of the systems 110, 120, 130, 142, 144 and 160 indicates an action performed by the associated system. Furthermore, tasks shown in a solid line indicate data transmitted "in the clear" or unencrypted, tasks shown in dotted dashed lines indicate tasks performed by the security server system 130 or tasks performed under the direction of security server system 130 and tasks shown in dotted lines indicate a transfer of encrypted data.

In step 202, the buyer system 110 initiates a connection to the merchant server system 120 over network 170. The buyer system 110 places one or more items in the shopping cart provided by the merchant server system 120, step 204, and proceeds to checkout, step 206, thus initiating the purchase transaction. Upon checkout, the buyer system 110 is transferred to the security server system 130, step 206. In the transfer, the merchant server system 120 references an XML document that contains instructions to the security server system 130 for what information is needed to be collected from the buyer system 110, and for which other server systems the resulting documents are to be encrypted. Security server system 130 maintains a schema to ensure that the merchant server system 120 cannot direct information to be encrypted for inappropriate recipients (such as credit cards to a delivery firm). Not all of the collected information needs to be encrypted, and some information may be encrypted for more than 1 recipient, and some may be both encrypted into documents and sent back "in the clear" or unencrypted. Security server system 130 serves forms (either created dynamically or drawn from a library of static forms) to the buyer system 110, step 208, to collect the sought information that was defined in the XML instructions of the merchant server system 120. In steps 210-214, the buyer system 110 provides, to the security server system 130, the necessary payment information, including credit card number and expiration date, the buyer system's email address and the buyer system's delivery address information. As the buyer's information is being received, the security server system 130 creates, in steps 212-218, an encrypted delivery document $E_1$ that includes the buyer's delivery address information and an encrypted payment document $E_2$ that includes the buyer's payment information. Encrypted delivery document $E_1$ preferably includes the buyer's name, delivery address, email address and the name of the delivery company. This document is encrypted with a key such that only the delivery server system is capable of decrypting the information contained therein. Encrypted payment document $E_2$ preferably includes a merchant identification number (MID), a transaction identification number (TID), the credit card type, number, expiration date, the name on the credit card, the billing address associated with the credit card digital signature, a debit limit, which ensures that the credit card is not charged above the order amount and an order expiration date. This document is encrypted with a key such that only the payment processor server system is capable of decrypting the information contained therein. Security server system 140 also creates an alias email address for the buyer. The alias email address is discussed in greater detail below with reference to FIG. 7. In step 218, the security server system creates a digest array, which includes all of the information collected by the security server system 130. This array is used to identify the buyer during future transactions, as is described in greater detail below with reference to FIG. 11A. In step 220, a package of the encrypted documents is assembled and transmitted to the merchant server system 120, step 222.

The package of information is transmitted to the merchant server system 120 as items in an XML document, including encrypted documents $E_1$ and $E_2$, and unencrypted documents and one or more digest arrays. The XML tags are not encrypted so that the XML document can be parsed by the merchant server system 120. The merchant server system 120 receives the XML document and parses out the discrete items, step 222. The items are stored in the merchant server system's order processing system, step 224. The merchant server system 120 sends the encrypted payment document $E_2$ to the participating merchant acquirer server system 142, step 226, which decrypts the document and transmits it to the bank server system 144, step 228, for authorization. In step 230, if the payment information is approved, the bank server system 144 transmits a payment authorization response to merchant acquirer server system 142, which transmits a payment authorization document to merchant server system 120, step 232.

Once the payment information has been approved and the merchant server system has received the payment authorization document, the merchant server system 120 transmits the encrypted delivery document $E_1$ and an order number to delivery server system 160, step 234. The delivery server system 160 decrypts the delivery document $E_1$ step 236, assigns an address signature to the order and transmits the address signature to the merchant server system 120, which notifies the buyer system 110 that the order has been successfully processed via the merchant server system website, step 236. The address signature is similar to a tracking number, but uniquely identifies a shipping address as opposed to just a package. In step 240, the merchant server system produces a label with the address signature only, since it does not have access to the buyer' delivery address information, and transmits a delivery request to the delivery server system 160. The delivery server system 160 matches the delivery request to the address signature which includes the buyer's delivery address information. The delivery server system 160 transmits a request to the security server system 130, step 242, for the security server system to notify the buyer of the delivery tracking number information via the security server system's secure email component 132, FIG. 7. Security server system 130 transmits the delivery tracking number information to the buyer via its secure email component 132, step 244. In step 246, the merchant server system 120 transmits the encrypted payment document $E_2$, as well as the payment authorization document, to the merchant acquirer server system 142, which decrypts the payment document $E_2$ and transmits a settlement request to the bank server system 144, step 248. Based on the payment authorization document, the bank approves the settlement request and transmits payment, in the form of a settlement response, to the merchant server system 120, step 250. In step 252, the delivery firm associated with the delivery server system 160 picks up the package from the merchant firm associated with the merchant server system 120, matches the address signature on the label provided by the merchant server system 120 to the delivery address information contained in the delivery document $E_1$ and delivers the package to the buyer.

Accordingly, the invention enables a purchase transaction to be completed without disclosing any of the buyer's private information to the merchant server system 120. By encrypting the buyer's delivery address information into a discrete delivery document that includes only the buyer's delivery address information in a form which only the delivery server system 160 can decrypt, the security server system 120 ensures that only the delivery server system obtains information pertaining to the delivery of the purchased item. Furthermore, by encrypting the buyer's payment information into a discrete document that includes only the buyer's payment information in a form which only the payment processor server system 140 can decrypt, the security server system 120 ensures that only the payment processor server system 140 obtains information pertaining to the payment of the purchased item. Since these discrete documents are encrypted before they are transmitted to the merchant server system 120, the merchant server system cannot access the buyer's information. This example transfers the pertinent information similar to the transaction shown in FIG. 3A.

Figure 5:
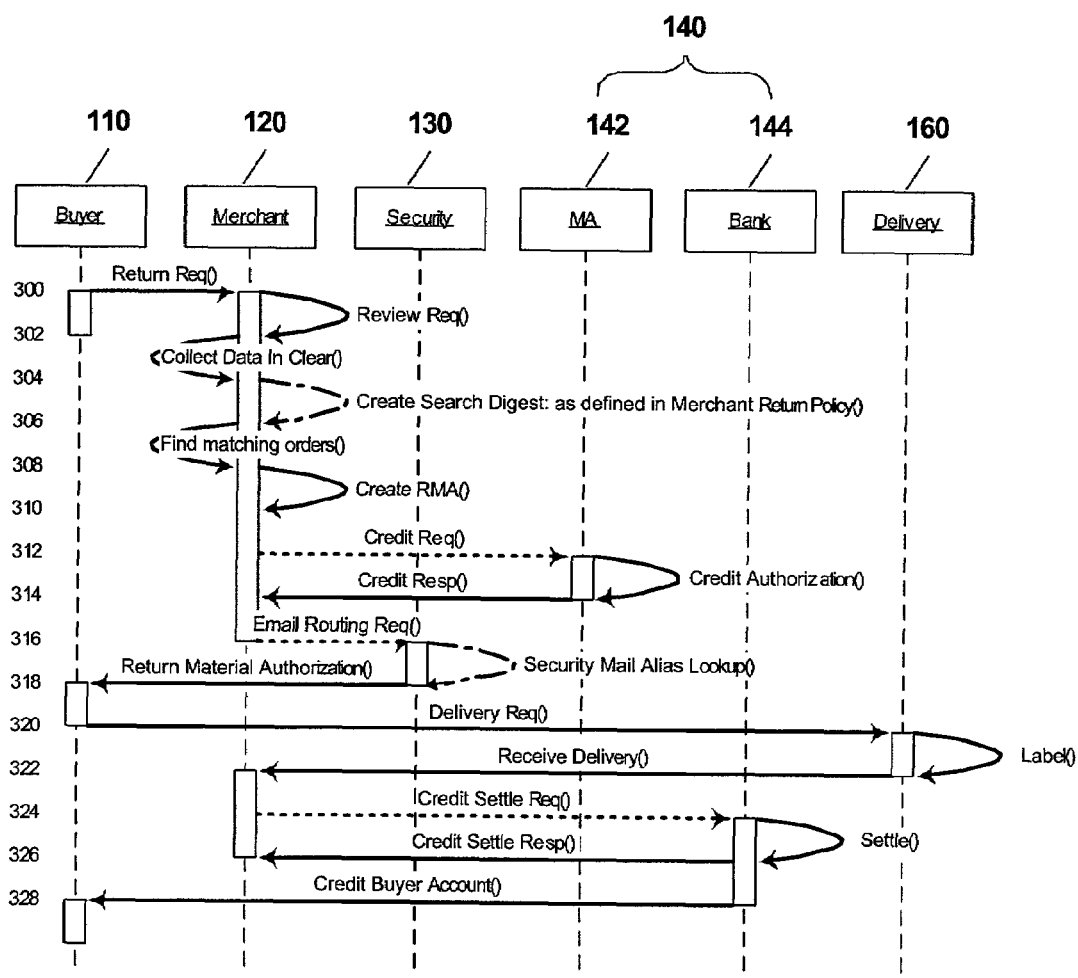
FIG. 5 is a schematic diagram showing the steps involved in a return transaction in accordance with the present invention.

FIG. 5 is a schematic diagram which shows a transfer of information between the buyer system 110, merchant server system 120, security server system 130, merchant acquirer server system 142, bank server system 144 and delivery server system 160 in a situation where the buyer returns a purchased product to the merchant for a refund. In step 300, the buyer system 110 informs the merchant server system 120, either by telephone or email, that the buyer would like to return a product. The merchant server system 120 validates the request, step 302, and initiates a digest request, step 304, in which the customer provides information about the order, step 306, so that the merchant can identify the order, step 308. The use of the digest array to identify a buyer is discussed in greater detail below with reference to FIG. 11B. Alternatively, order receipts and other proofs of purchase can be used to authenticate the buyer system 110 without drawing on a digest array created during the initial order. If the buyer is successfully authenticated, the merchant server system 120 approves the return, step 310 and transmits the encrypted payment document from the initial transaction to the merchant acquirer server system 142 for a credit authorization, step 312. The merchant acquirer server system 142 authorizes the credit and transmits a credit authorization to the merchant server system 120, step 314. The merchant server system 120 then transmits a return material authorization (RMA) number in an email to the buyer system 110 through the secure email component 132 of the security server system 130, steps 316, 318. The buyer sends the item back to the merchant through the delivery firm using the RMA, steps 320, 322. The merchant server system requests a credit settlement from the bank server system 144, step 324. The bank server system transmits the credit settlement to the merchant server system 120, step 326 and the bank server system 144 provides the appropriate credit to the buyer's credit card, step 328.

Figure 6A:
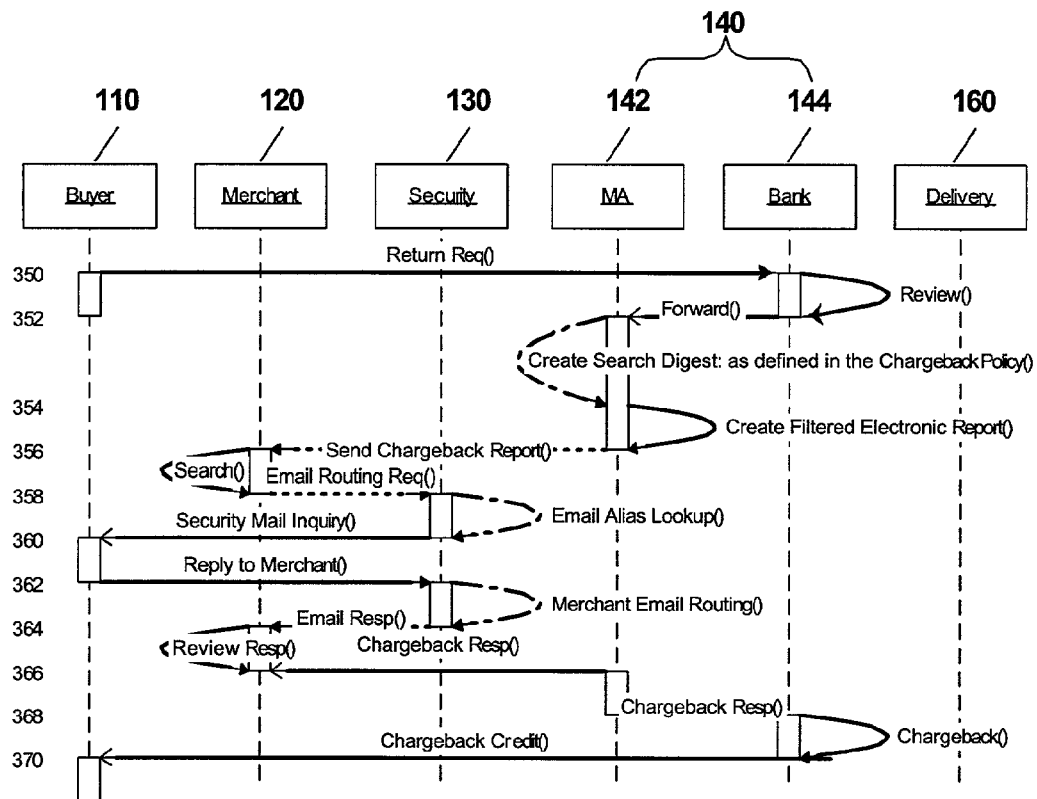
FIGS. 6A-6C are a schematic diagrams showing the steps involved in a chargeback transaction in accordance with the present invention.
Figure 6B:
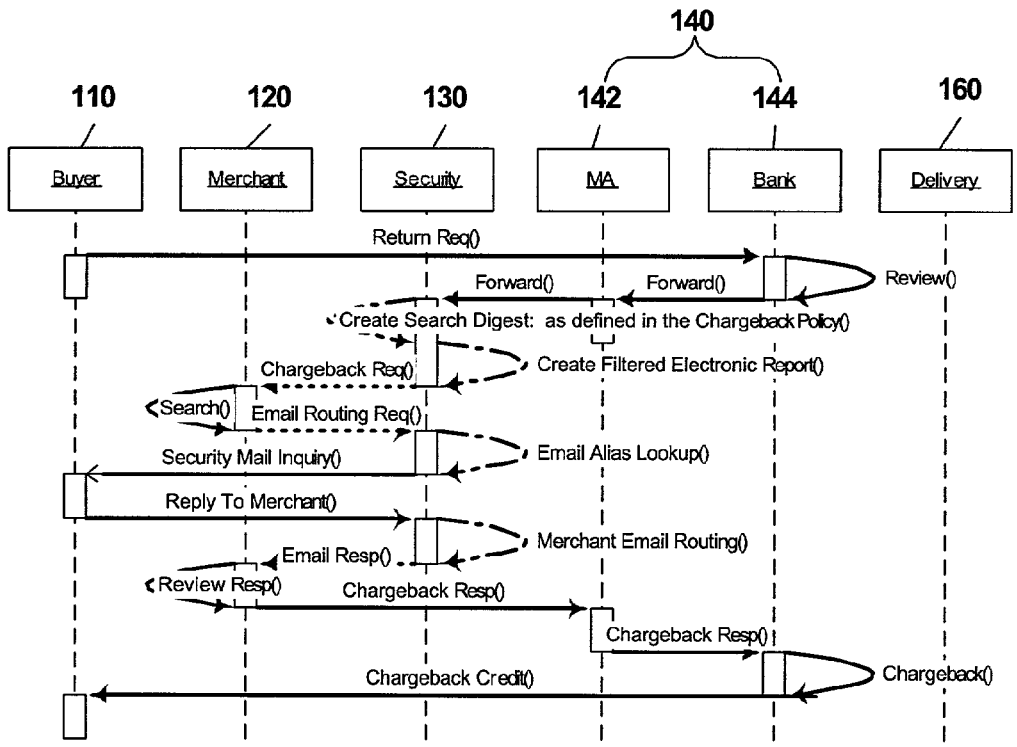
Figure 6C:
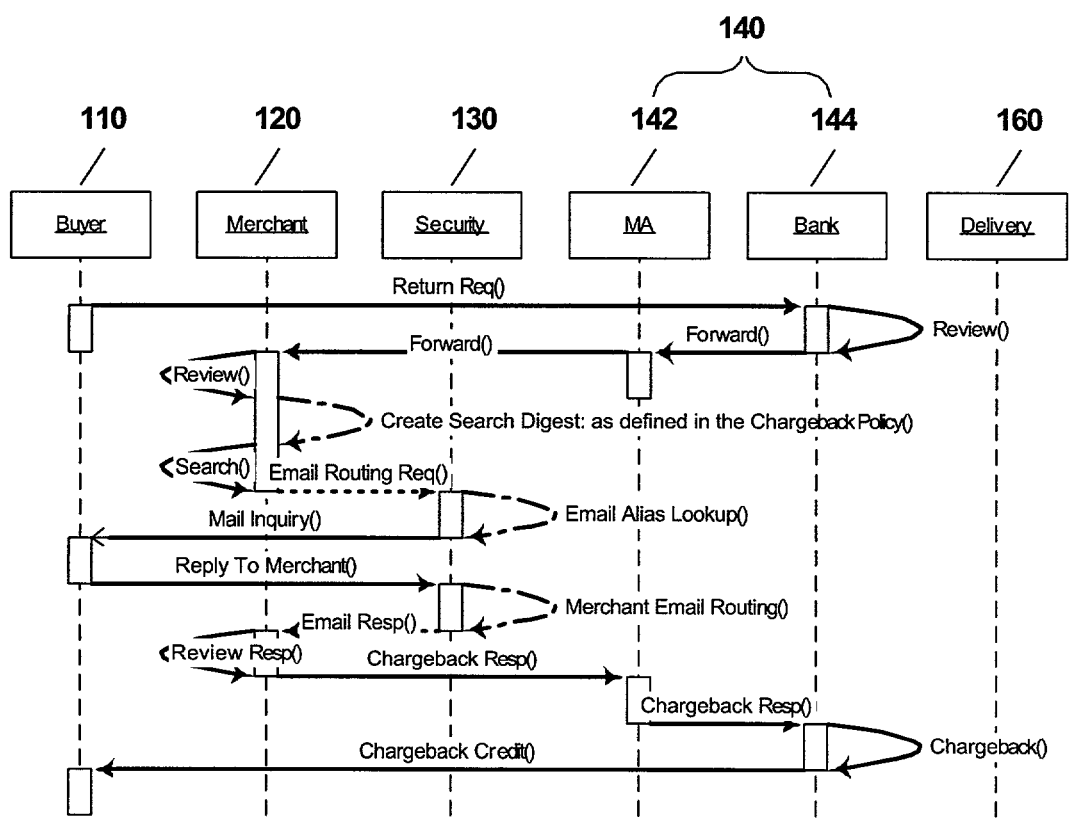

FIGS. 6A, 6B and 6C are schematic diagrams which show a transfer of information between the buyer system 110, merchant server system 120, security server system 130, merchant acquirer server system 142 and bank server system 144 in the case of a buyer-initiated chargeback. A chargeback occurs when the buyer informs the bank that it will not pay for a charge resulting from a transaction. In step 350, FIG. 6A, the buyer system 110 initiates the chargeback by informing the bank server system 144 that the charge will not be honored. The bank server system 144 reviews the request, step 352 and instructs the merchant acquirer server system 142 to search for the payment document associated with the request, step 354. The merchant acquirer server system 142 transmits a report to the merchant server system including the nature of the complaint, step 356. The report only identifies the specific transaction to the merchant server system 120. At this point, the merchant server system only possesses information about the specific transaction and does not posses any of the buyer's personal information. The merchant server system 120 and the buyer system 110 communicate with each other anonymously through the secure email component of the security server system 130, steps 358-364. The merchant server system then transmits a chargeback response to the merchant acquirer server system 142, step 366. The merchant acquirer server system 142 transmits the request to the bank server system 144, step 368, and the bank server system issues a chargeback credit to the buyer's credit card, step 370.

The process shown in FIG. 6B is similar to the process shown in FIG. 6A, with the difference being that the security server system 130 creates the report to the merchant server system 120 rather than the merchant acquirer server system 142. This enables the security server system 130 to either encrypt or withhold private information of the buyer from the merchant server system. The process shown in FIG. 6C is also similar to the process shown in FIG. 6A, with the difference being that the merchant server system 120 receives the chargeback request directly from the bank server system 144 without any intervention from the merchant acquirer server system 144 or the security server system 130.

The security server system 130 is also capable of enabling private email communications between parties, in particular between the buyer system 110 and the merchant server system 120. Security server system 130 includes a secure email component 132, FIG. 7, with which both the buyer system 110 and the merchant server system register. The secure email component 132 receives the buyer system's true email address and assigns a buyer alias email address to the buyer's true address. Likewise, the secure email component 132 receives the merchant server system's true email address and assigns a merchant alias address to the merchant's true address. All email transactions between the buyer system 110 and the merchant server system 120 pass through the secure email component 132. In this way, the neither party possesses the other party's true email address and all communication takes place through the secure email component with the alias email addresses.

Figure 7:
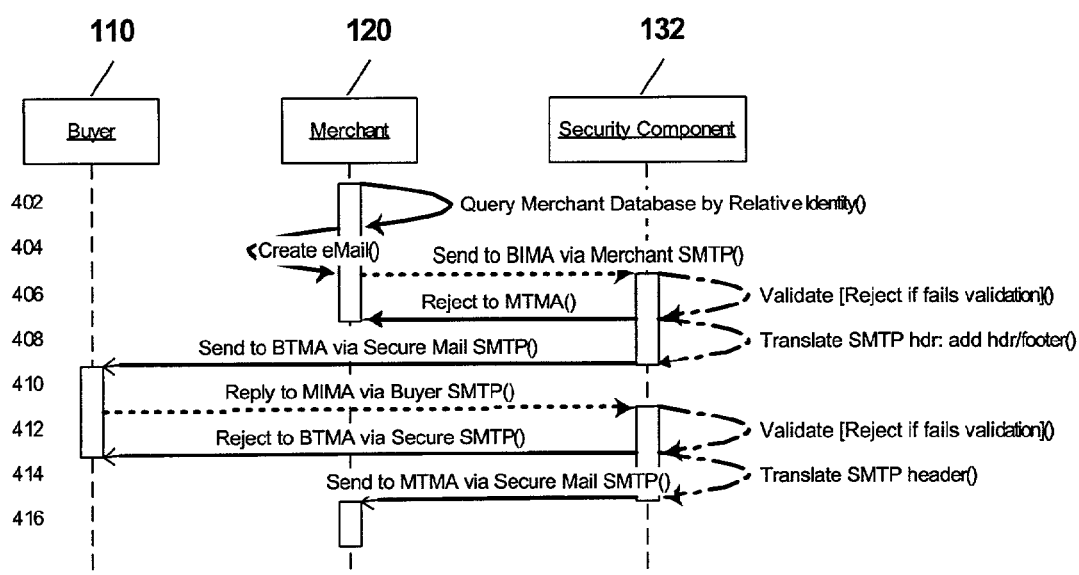
FIG. 7 is a schematic diagram showing the steps involved in enabling private communication between a merchant and a buyer using alias email addresses in accordance with the present invention.

FIG. 7 is a schematic diagram which shows this process. In step 402, the merchant server system identifies a buyer to which it will send an email message. The message is created, step 404, and sent to the buyer's alias email address via the merchant's SMTP server. The email is directed to the secure email component 132 by the buyer's alias address, step 406, where it is validated by the secure email component 132. Validation involves ensuring that a particular merchant is authorized to send email to a particular buyer with the buyer's alias email address. If the validation is rejected, the message is returned to the merchant's true email address, step 408. If the validation is approved, the secure email component 132 rewrites the SMTP header on the email message, changing the buyer's alias email address to the buyer's true email address, and the merchant's true email address to the merchant's alias email address. The message is then sent to the buyer system 110 via the secure email component's SMPT server, step 410. If the buyer system 110 replies to the merchant's email message, the reply is sent via the buyer's SMTP server to the merchant's alias email address, step 412. The message is then validated in the same manner as the original email message from the merchant server system 120. If validation fails, the message is returned to the buyer's true e-mail address without having been delivered to the merchant server system 120, step 414. If validation does not fail, the secure email component 132 rewrites the SMTP header on the mail message, changing the merchant's alias to the merchant's true e-mail address, and the buyer's true e-mail address to the buyer's alias email address. The message is then sent via the secure email component's SMTP server to the merchant's true e-mail address (MTMA).

Figure 8:
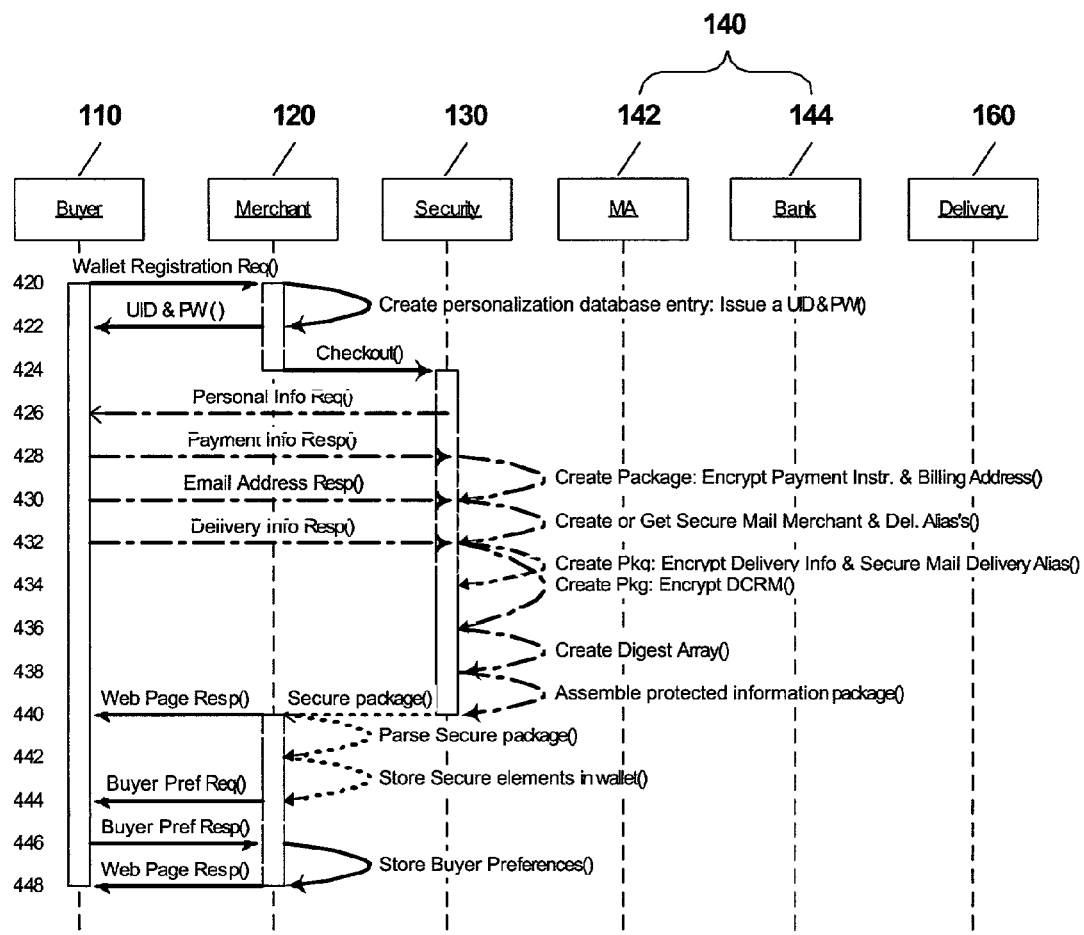
FIG. 8 is a schematic diagram showing the steps involved in the creation of an electronic wallet in accordance with the present invention.

In order to simplify the transaction consummation process, the system of the present invention enables the buyer system 110 to create an electronic "wallet" which includes all of the buyer's information such as delivery address information and payment information. The security server system creates the wallet by encrypting the delivery address information into a delivery document $E_1$ and encrypting the payment information into a payment document $E_2$ as described above. Once the wallet is created, it is stored in a database on the merchant server system 120 for future purchase transactions. FIG. 8 is a schematic diagram of the process involved in the creation of the electronic wallet. In step 420, the buyer system 110, from the merchant server system website, requests that a wallet be created. The merchant server system prompts the buyer system 110 to create a user name and password, step 422. The merchant server system then directs the buyer system 110 to the security server system 130, step 424, where the wallet creation takes place. The security server system 130 sends a personal information request form to the buyer system 110, step 426. In response, the buyer system 110 provides the required information to the security server system 130, including the buyer's payment information, step 428, true email address, step 430 and delivery address information, step 432. The security server system 130 receives the information and encrypts the delivery address information into the delivery document $E_1$, encrypts the payment information into the payment document $E_2$ and creates an alias email address for the buyer system, steps 430-434. A digest array is created from the received information, step 436, and a protected information package is assembled, step 438, which includes all of the buyer's information in a form which is not decryptable by the merchant server system 120. The package is transmitted to the merchant server system 120, which notifies the buyer system 110 via its website that the wallet has been successfully created, step 440. The merchant server system then parses the package into its separate documents, step 442, and stores the documents in a "wallet" associated with the particular buyer in a database of the merchant server system 120. The merchant server system 120 may request other information from the buyer, such as buyer preferences and behavior profiles, which information is stored in the wallet with the buyer's encrypted information, steps 444-448.

Figure 9:
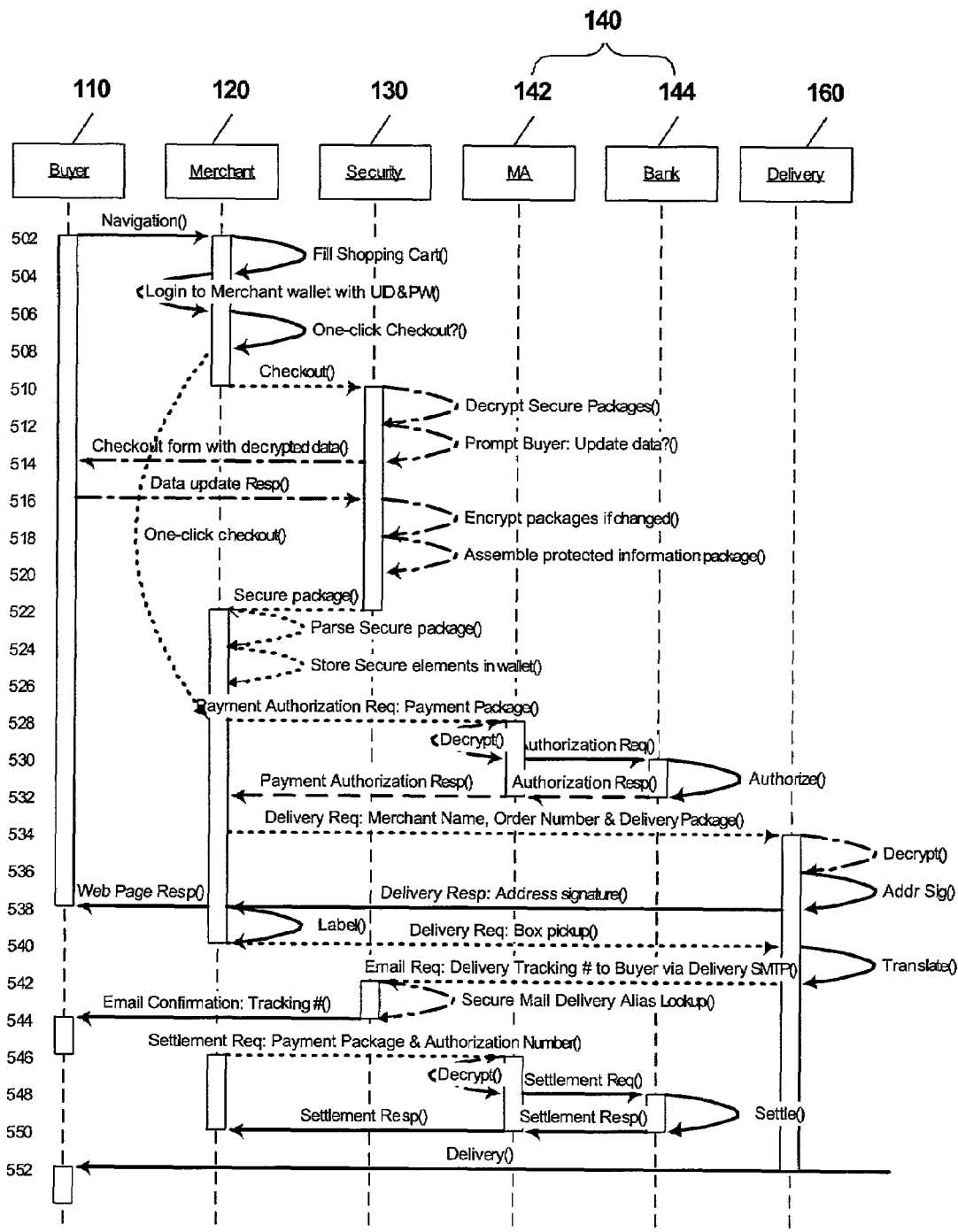
FIG. 9 is a schematic diagram showing the steps involved in a purchase transaction using the electronic wallet in accordance with the present invention.

FIG. 9 is a schematic diagram of a transaction according to the present invention which includes the use of the electronic wallet described above. In step 502, the buyer system 110 establishes a connection with the merchant server system 120 over the network 170. The buyer system 110 places items in its shopping cart, step 504 and, when ready to checkout, logs into its wallet which is stored on the merchant server system 120 using its user name and password, step 506. The merchant server system 120 then asks if the buyer would like to follow an automatic checkout procedure, step 508. If no changes are to be made to the buyer system's information, the buyer system will choose this procedure. The process then proceeds to step 528, to continue the transaction, wherein steps 528-552 are identical to steps 228-252 of FIG. 4.

If the buyer system 110 does not select the automatic checkout, the merchant server system 120 transmits the wallet information to the security server system 130, step 510. The security server system decrypts the wallet information, step 512, and transmits a form to the buyer system 110 with a prompt to make any necessary changes to the information, steps 514, 516. The security server system 130 encrypts the updated information into the delivery document $E_1$ and payment document $E_2$, step 518. The new protected information package is assembled, step 520, and transmitted to the merchant server system 120 to update the buyer's wallet information. The transaction then proceeds with steps 522-552, which are identical to steps 222-252 of FIG. 4.

Figure 10:
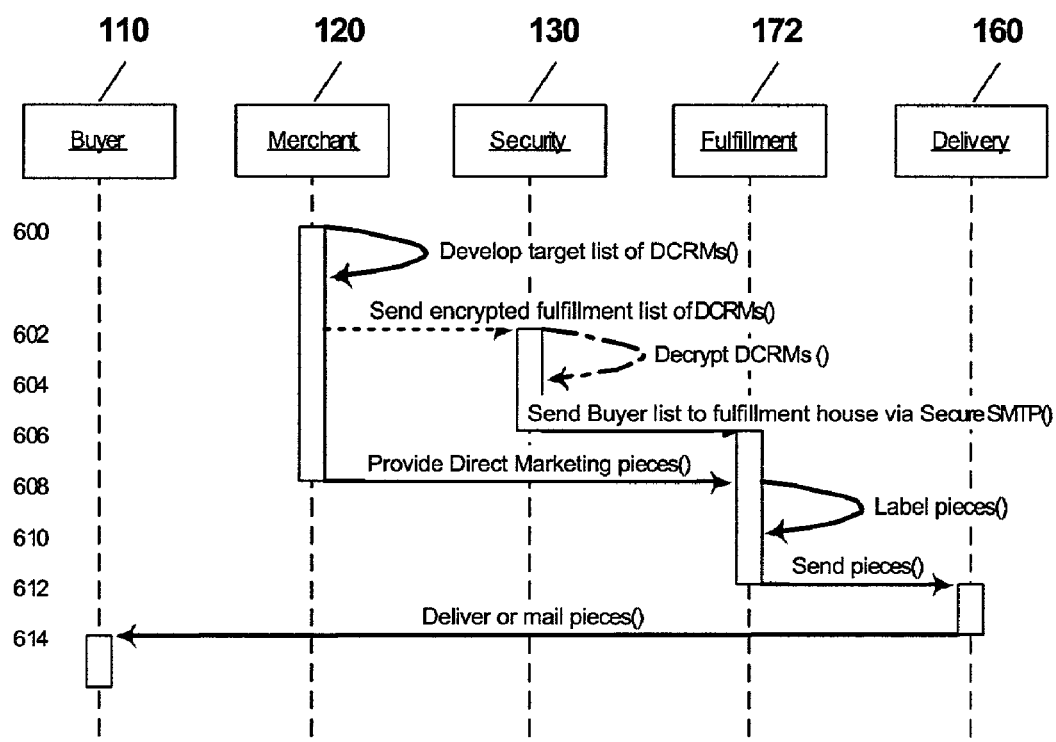
FIG. 10 is a schematic diagram showing the steps involved in a direct marketing fulfillment transaction in accordance with the present invention.

The security server system 130 of the present invention is also capable of enabling the merchant server system 120 to conduct a direct marketing fulfillment process while keeping the buyer system's information private. FIG. 10 is a schematic diagram showing the steps involved in this process. In step 600, the merchant server system 120 develops a target list of buyer's to which it will send direct marketing material. Since all of the buyer information in the possession of the merchant server system is encrypted, this target list is also encrypted. However, since the different encrypted documents associated with each buyer system or parsable by the merchant server system 120, it is able to provide a list to the security server system 130 which includes the encrypted delivery address information of its buyers to the security server system 130, step 602. The security server system 130 decrypts the buyer list, step 604, and transmits the buyer list to a fulfillment server system 172, step 606. The fulfillment server system 172 receives the direct marketing pieces from the merchant server system, step 608, labels them with the delivery address information received from the security server system 130, step 610, and sends the labeled pieces to the delivery firm associated with the delivery server system 160, step 612. The delivery firm then delivers the direct marketing pieces to the buyers. This process enables the merchant server system to cause direct marketing pieces to be delivered to buyers without the need for the merchant server system 120 to possess the actual delivery address information of the buyers.

Figure 11A:
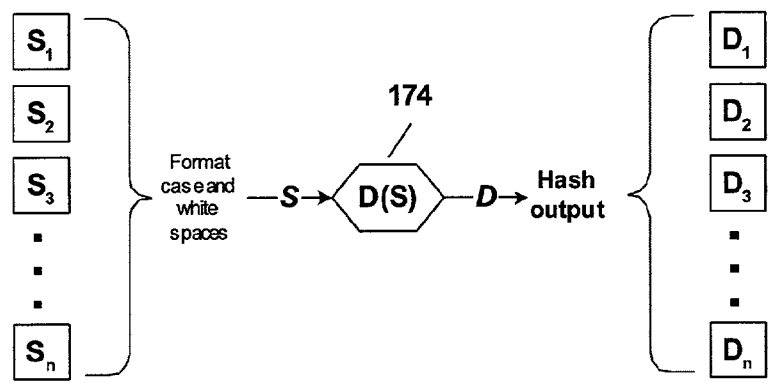
FIG. 11A is a schematic diagram showing the creation of a digest array in accordance with the present invention.

FIG. 11A is a schematic diagram showing the process involved in the creation of a digest array, which occurs when the buyer system's information is first input to the security server system 130. When the security server system receives the buyer's information, such as in steps 210-214 of FIG. 4, the information $S_1$-$S_n$, in addition to being encrypted into documents that can only be decrypted by a predetermined intended party, is passed through a hashing function 174 such as the Secure Hash Algorithm (SHA), which creates a hash output $D_1$-$D_n$, corresponding to the information $S_1$-$S_n$. The digest array is stored on the merchant server system 120 for future reference.

Figure 11B:
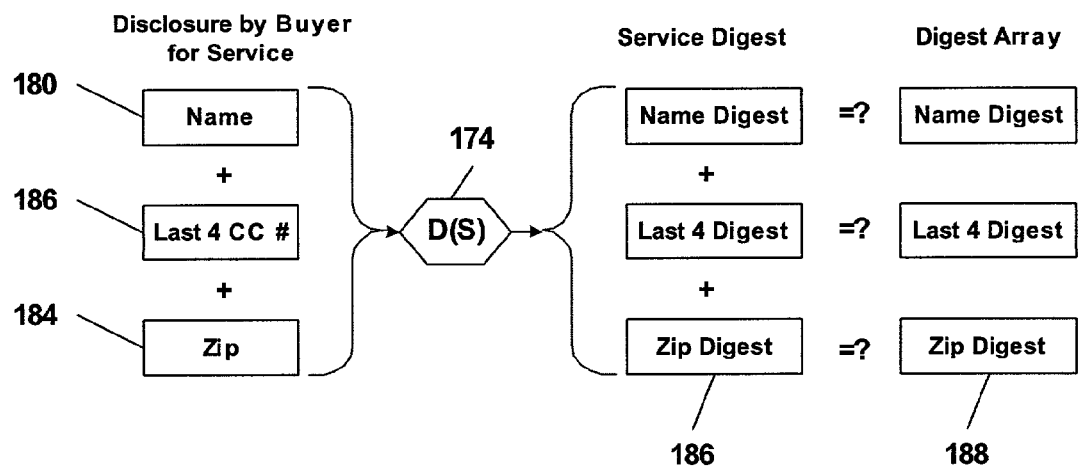
FIG. 11B is a schematic diagram showing the steps involved utilizing a digest array to identify a buyer in accordance with the present invention.

If the buyer system 110 needs to contact the merchant server system regarding a particular order, the merchant server system can match the buyer with the particular order by using the digest array. For example, in the return process shown in FIG. 5, the buyer provides information to the merchant server system 120 and the merchant server system searches its digest array to match the buyer with the particular order. As shown in FIG. 11B, the buyer system discloses certain portions of information, such as its name 180, the last 4 digits of its credit card 182 and its zip code 184. This information is passed through hashing function 174 to form hash outputs 186 corresponding to the information 180, 182 and 184. The merchant server system 120 searches the digest array 188 until the information provided by the buyer enables a match in the digest array 188 that enables the merchant server system to identify the particular order.

Figure 12A:
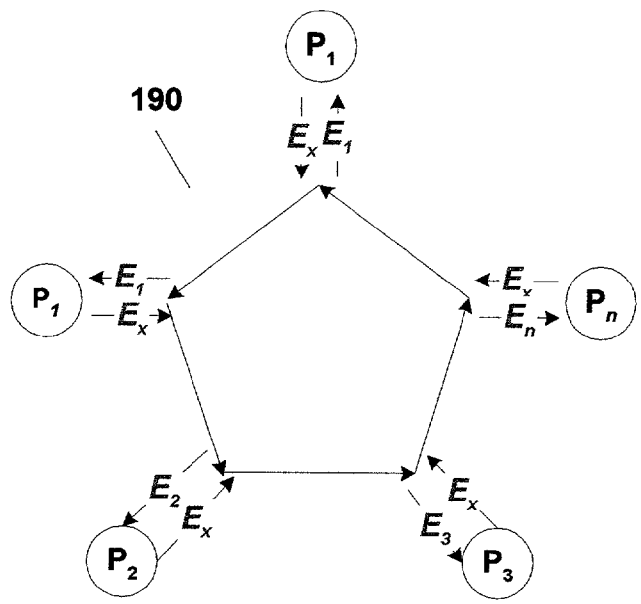
FIGS. 12A-12B are schematic diagrams showing other types of purchase transaction schemes in accordance with the present invention.
Figure 12B:
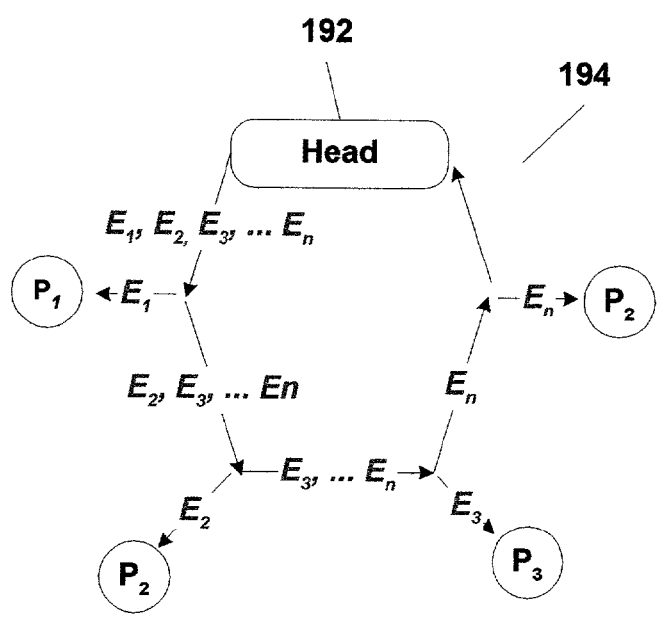

Accordingly, the present invention provides a method of and system for enabling online transactions in which the merchant does not have access to the buyer's private delivery address information and payment information. The security server system encrypts the delivery address information to form a delivery document which can be decrypted only by the delivery server system. The security server system also encrypts the payment address information to form a payment document which can be decrypted only by the payment processor server system. The delivery document and the payment document are provided by the security server system to the merchant server system, which, in turn, distributes the documents to the respective server systems for processing during the course of an online transaction. While, in the example of FIG. 4, the transaction carried out is in the form of the combination encryption pipe/fork transaction shown in FIG. 3A, it will be understood that the system can be utilized to carry out any or all of the transaction types shown in FIGS. 3A-3E. Furthermore, the system and method of the present invention can be utilized to carry out transactions which take the form of a token passing ring, such as is shown in FIG. 12A, wherein encrypted documents may be passed among all of the parties in the ring 190 and a distributive ring, such as is shown in FIG. 12B, wherein a head party introduces encrypted documents into the ring 194, which documents are then passed among the other parties of the ring 194.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A transaction system for performing secure transactions over a communication network comprising:
   a merchant server system including a computer processor and associated memory, said merchant server system offering items for sale;
   a buyer system including a computer processor and associated memory, said buyer system being selectively coupled to said merchant server system over said communication network to initiate a transaction, wherein, during said transaction, said buyer system selects one or more of said items for purchase;
   a security server system distinct from said merchant server system and including a computer processor and associated memory and an encryption device, said security server system receiving buyer information from said buyer system, encrypting said buyer information in an encryption key that prevents said merchant server system from decrypting said buyer information, and transferring said encrypted buyer information to said merchant server system; and
   a payment processor server system distinct form the security server system and including a computer processor and associated memory, said payment processor server system being selectively coupled to said merchant server system, wherein said merchant server system transmits at least a payment portion of said encrypted buyer information to said payment processor server system for processing during said transaction
   wherein said merchant server system cannot decrypt said encrypted payment information and said payment processor server system can decrypt said encrypted payment information; and
   wherein said payment processor server decrypts said encrypted payment information and using said decrypted payment information, determines if said transaction is authorized or not, and communicates said determination to said merchant server system.

2. The transaction system of claim 1 further comprising a delivery server system including a computer processor and associated memory said delivery server system being selectively coupled to one of said merchant server system and said payment processor server system, wherein said one of said merchant server system and said payment processor server system transmits at least a delivery information portion of said encrypted buyer information to said delivery server system for processing during said transaction
   wherein said delivery server system decrypts said encrypted delivery information to determine a delivery address for delivery of said one or more selected items.

3. The transaction system of claim 2 wherein said encrypted buyer information received by said delivery server system is delivery address information of said buyer.

4. The transaction system of claim 2 wherein said security server system encrypts said buyer information into a first document and a second document, wherein said first document is transmitted to said payment processor server system by said merchant server system and said second document is transmitted to said delivery server system by said merchant server system.

5. The transaction system of claim 4 wherein said first document contains one of the buyer system's delivery address information and the buyer system's payment information and the second document contains the other of said buyer system's delivery address information and said buyer system's payment information.

6. The transaction system of claim 5 wherein said security server system encrypts said first document using a first encryption key and said second document using a second encryption key, wherein said one of said payment processor server system and said delivery server system that receives said first document can decrypt said first document but not said second document and wherein said other one of said payment processor server system and said delivery server system that receives said second document can decrypt said second document but not said first document.

7. The transaction system of claim 2 wherein said security server system encrypts said buyer information into a first document and a second document, wherein said first and second documents are transmitted to said payment processor server system by said merchant server system and said second document is transmitted to said delivery server system by said payment processor server system.

8. The transaction system of claim 7 wherein said first document contains one of the buyer system's delivery address information and the buyer system's payment information and the second document contains the other of said buyer system's delivery address information and said buyer system's payment information.

9. The transaction system of claim 8 wherein said security server system encrypts said first document using a first encryption key and said second document using a second encryption key, wherein said one of said payment processor server system and said delivery server system that receives said first document and second documents from said merchant server system can decrypt said first document but not said second document and wherein said other one of said payment processor server system and said delivery server system that receives said second document can decrypt said second document but not said first document.

10. A system for performing secure transactions over a communication network comprising:
    a merchant server system including a computer processor and associated memory, said merchant server system offering items for sale;
    a buyer system including a computer processor and associated memory, said buyer system being selectively coupled to said merchant server system over said communication network to initiate a transaction, wherein, during said transaction, said buyer system selects one or more of said items for purchase;
    a security server system distinct from said merchant server system and including a computer processor and associated memory, said security server system being selectively coupled to said buyer system to receive buyer information from said buyer system in the course of said transaction, said buyer information including delivery address information and payment information;
    a delivery server system including a computer processor and associated memory; and
    a payment processor server system distinct form the security server system and including a computer processor and associated memory;

wherein said security server encrypts and transmits said delivery address information to said delivery server system and said payment information to said payment processor server system by way of said merchant server system, said delivery address information and said payment information of said buyer information being not otherwise provided to said merchant server system;

wherein said delivery server system decrypts said encrypted delivery address information to determine a delivery address for delivery of said one or more selected items.

11. The transaction system of claim 10 wherein said security server system encrypts said delivery address information into a first document and encrypts said payment information into a second document.

12. The transaction system of claim 11 wherein said security server system transmits said first and second documents to said merchant server system, which transmits said first document to said delivery server system and said second document to said payment processor server system; and wherein said merchant server system cannot decrypt said first and second documents.

13. A system for performing secure transactions over a communication network comprising:

a merchant server system including a computer processor and associated memory, said merchant server system offering items for sale;

a buyer system including a computer processor and associated memory, said buyer system being selectively couplable to said merchant server system over said communication network to initiate a transaction, wherein, during said transaction, said buyer system selects one or more of said items for purchase;

a delivery server system including a computer processor and associated memory;

a payment processor server system including a computer processor and associated memory; and a security server system distinct from said merchant server system and said payment processor server system and including a computer processor and associated memory and an encryption device, said security server system receiving buyer information from said buyer system and forming a merchant document associated with said merchant server system and including information regarding the item being purchased, encrypting said buyer information into a payment document associated with said payment server system and including the buyer's payment information and encrypting said buyer information into an address document associated with said delivery server system and including the buyer's shipping address;

said security server system transferring said buyer information to a first one of said merchant server system said payment server system and said delivery server system, wherein said first system removes the document associated with the first system and transmits the remaining documents to a second one of said merchant server system, said payment server system and said delivery server system, wherein said second system removes the document associated with the second system and transmits the remaining document to a third one of said merchant server system, said payment server system and said delivery server system;

wherein said security server system encrypts said buyer information using an encryption key in which only said payment server system can decrypt said payment document and only said delivery server system can decrypt said address document; and wherein said payment server system decrypts said encrypted payment information and using said decrypted payment information, to determine if said transaction is authorized or not, and communicates said determination to said merchant server system wherein said delivery server system decrypts said encrypted delivery information to determine a delivery address for delivery of said one or more selected items.

14. A method for performing secure transactions over a communication network comprising:

A. establishing a connection between a buyer system and a merchant server system over said communications network to initiate a purchase transaction;

B. said buyer system selecting an item offered for sale by said merchant server system;

C. said buyer system transmitting buyer information to a security server system distinct from said buyer system;

D. said security server system encrypting said buyer information using an encryption key that prevents said merchant server system from decrypting said encrypted buyer information;

E. said security server system transmitting said encrypted buyer information to said merchant server system;

F. said merchant server system transmitting at least a payment information portion of said encrypted buyer information to a payment processor server system for processing during said purchase transaction, said payment processor system being distinct from said security server system; and G. said payment processor server system decrypting said at least a portion of said encrypted buyer information before processing said information and then using said decrypted payment information determines if said transaction is authorized or not, and communicates said determination to said merchant server system.

* * * * *